US012668085B2

(12) United States Patent
Weiser et al.

(10) Patent No.: US 12,668,085 B2
(45) Date of Patent: Jun. 30, 2026

(54) AGRICULTURAL VEHICLE FOR PROVIDING IMPROVED LOAD DISTRIBUTION WHEN TOWING AN IMPLEMENT

(71) Applicant: CNH Industrial America LLC, New Holland, PA (US)

(72) Inventors: Carter Weiser, Fargo, ND (US); Chad Sietsema, Barnesville, MN (US); John Rasset, Barnesville, MN (US)

(73) Assignee: CNH Industrial America LLC, New Holland, PA (US)

( * ) Notice: Subject to any disclaimer, the term of this patent is extended or adjusted under 35 U.S.C. 154(b) by 554 days.

(21) Appl. No.: 18/139,496

(22) Filed: Apr. 26, 2023

(65) Prior Publication Data

US 2024/0359513 A1 Oct. 31, 2024

(51) Int. Cl.
| | |
|---|---|
| *B60D 1/14* | (2006.01) |
| *A01B 59/042* | (2006.01) |
| *B60D 1/24* | (2006.01) |

(52) U.S. Cl.
CPC ............ *B60D 1/143* (2013.01); *A01B 59/042* (2013.01); *B60D 1/247* (2013.01)

(58) Field of Classification Search
CPC ...... A01B 59/042; B60D 1/143; B60D 1/247; B60D 2001/008
USPC ........................................................ 280/498
See application file for complete search history.

(56) References Cited

U.S. PATENT DOCUMENTS

| | | | |
|---|---|---|---|
| 4,529,220 A | 7/1985 | Wright et al. | |
| 7,625,003 B2 | 12/2009 | Tveito et al. | |
| 9,067,629 B2 | 6/2015 | Van Der Knaap et al. | |
| 2015/0054259 A1* | 2/2015 | Smith ...................... | B60D 1/28 |
| | | | 280/515 |

(Continued)

FOREIGN PATENT DOCUMENTS

| | | |
|---|---|---|
| CA | 3006119 C | 9/2019 |
| DE | 1655744 A1 | 4/1971 |
| DE | 3934121 A1 | 4/1991 |

OTHER PUBLICATIONS

Zoro Aftermarket Drawbar Support Retrieved Nov. 23, 2022 (5 pages) https://www.zoro.com/aftermarket-drawbar-support-383385r3/j/G005627551/?utm_source=google&utm_medium=surfaces&utm_campaign=shopping%20feed&utm_content=free%20google%20shopping%20clicks&glcid=EAIaIQobChMI_b7x2YLFwlVAntvBB1OoAXSEAQYDyABEglZHPD_%20BwE%20on%2011%2F23%2F2022.

(Continued)

*Primary Examiner* — Valentin Neacsu
*Assistant Examiner* — Felicia L. Brittman-Alabi
(74) *Attorney, Agent, or Firm* — Dority & Manning, P.A.

(57) ABSTRACT

Many agricultural vehicles utilize a drawbar to pull an implement. Generally, drawbars are mounted to the vehicle at one end and mounted to a drawbar hanger at another end. A drawbar hanger is commonly coupled to a frame rear end of a vehicle with a set of brackets. During towing operations, the implement may exert varying amounts of force on the drawbar. As such, the drawbar may exert varying amounts of force on the drawbar hanger, which may exert varying amounts of force on the frame rear end of the vehicle. As such, the brackets coupling the drawbar hanger to the frame rear end may experience deformation and/or stress, which, in turn, may cause deformation and overloading of the frame (Continued)

rear end of the vehicle. As such, a vehicle for providing improved load distribution while towing an implement would be useful.

20 Claims, 5 Drawing Sheets

(56) References Cited

U.S. PATENT DOCUMENTS

2021/0372080 A1    12/2021   Reang et al.

OTHER PUBLICATIONS

Cross Creek Tractor Aftermarket Part Drawbar Kit (5 pages) https://www.crosscreektractor.com/default.aspx?page=item%20detail &itemcode=CFPN820A&gclid=EAIaIQobChMI_b7x2YLF-wIVAntvBB1OoAXSEAQYASABEgI_3PD_BwE%20on%2011/23/2022.
Quality Farm Supply Hanger for SDA6 Center Drawbar Kit Retrieved Nov. 23, 2022 (3 pages) https://qualityfarmsupply.com/?%20variant=33327402713219&currency=USD&gclid=EAIaIQobWIVAntvBB1OoAXSEAQYAiABEgIWqPD_BwE%20on%2011%2F23%2F2022&utm_campaign=gs-2022-02-%2027&utm_content=sag_organic&utm_medium=smart_campaign&utm_source=google.

* cited by examiner

AGRICULTURAL VEHICLE FOR PROVIDING IMPROVED LOAD DISTRIBUTION WHEN TOWING AN IMPLEMENT

FIELD OF THE INVENTION

The present subject matter relates generally to agricultural vehicles and, more particularly, to an agricultural vehicle for providing improved load distribution when towing an implement.

BACKGROUND OF THE INVENTION

A common use of agricultural vehicles, such as agricultural tractors, is to move implements through agricultural fields to cultivate and condition the soil. Many agricultural vehicles, such as a tractor, utilize a drawbar to pull an implement behind the vehicle. Conventional drawbars are mounted to the vehicle at one end and pivotably mounted to a drawbar hanger at another end such that an implement has a wide range of potential motion and may pivot about the end mounted to the vehicle. A drawbar hanger is commonly coupled to a frame rear end of an agricultural vehicle with a set of brackets. For example, a drawbar hanger may be coupled to the frame rear end of the agricultural vehicle with a set of welded gussets.

When an implement, such as a tillage implement, is being towed, the implement may exert varying amounts of force on the drawbar during operation. As such, the drawbar may exert varying amounts of force on the drawbar hanger, which may, in turn, exert varying amounts of force on the frame rear end of the agricultural vehicle throughout the implement range of motion. When force is exerted on the frame rear end of the agricultural vehicle during towing operations, the brackets coupling the drawbar hanger to the frame rear end may experience large amounts of stress, which, in turn, may reduce the service life of the brackets.

Accordingly, an agricultural vehicle for providing improved load distribution when towing an implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an agricultural vehicle. The agricultural vehicle includes a frame. The agricultural vehicle may also include a draw bar assembly pivotably coupled to the frame and configured to be coupled to an agricultural implement and a draw bar hanger coupled to the frame and the draw bar assembly. The draw bar hanger may include a first lateral plate coupled to the frame, wherein a junction of the first lateral plate and the frame defines a first corner. The draw bar hanger may also include a second lateral plate opposite the first lateral plate coupled to the frame, wherein a junction of the second lateral plate and the frame defines a second corner. Furthermore, the draw bar hanger may include a structural member extending along a lateral direction from the first lateral plate to the second lateral plate, wherein a junction of the structural member and the first lateral plate define a third corner and a junction of the structural member and the second lateral plate define a fourth corner. Additionally, the draw bar hanger may include a cross-bracing plate including an arm configured to distribute a towing load received from the agricultural implement throughout the cross-bracing plate, the cross-bracing plate extending along the lateral direction from the first lateral plate to the second lateral plate and along a longitudinal direction from the frame to the structural member.

In another aspect, the present subject matter is directed to a hitch assembly for an agricultural vehicle. The hitch assembly may include a draw bar assembly pivotably coupled to a frame of an agricultural vehicle and configured to be coupled to an agricultural implement and a draw bar hangar coupled to the frame and the drawbar assembly. The draw bar hanger may include a cross-bracing plate including a first surface, a second surface, a third surface, and a plurality of arms configured to distribute the load received from the agricultural implement throughout the cross-bracing plate. Moreover, the first surface and the second surface of the cross-bracing plate are parallel to a field surface and have larger surface areas than the third surface. Additionally, the plurality of arms of the cross-bracing plate may include a first arm and a third arm extending along a first diagonal direction from a first end to a second end and a second arm and a fourth arm extending along a second diagonal direction opposite the first diagonal direction from a first end to a second end.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
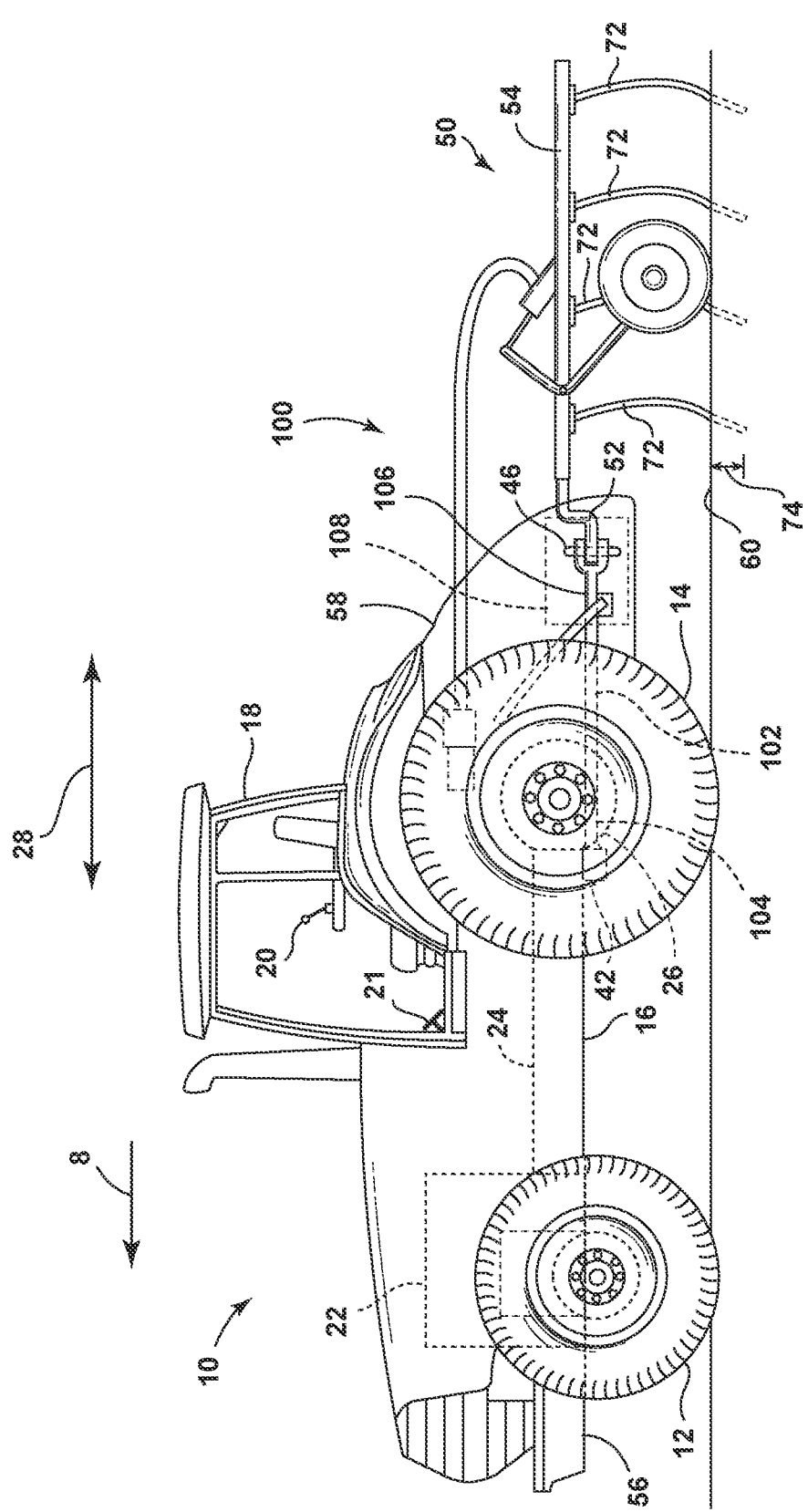
FIG. 1 illustrates a side view of one embodiment of an agricultural vehicle towing an implement in accordance with aspects of the present subject matter.

DETAILED DESCRIPTION OF THE
INVENTION

Reference now will be made in detail to embodiments of
the invention, one or more examples of which are illustrated
in the drawings. Each example is provided by way of
explanation of the invention, not limitation of the invention.
In fact, it will be apparent to those skilled in the art that
various modifications and variations can be made in the
present invention without departing from the scope or spirit
of the invention. For instance, features illustrated or
described as part of one embodiment can be used with
another embodiment to yield a still further embodiment.
Thus, it is intended that the present invention covers such
modifications and variations as come within the scope of the
appended claims and their equivalents.

In general, the present subject matter is directed to an
agricultural vehicle having a hitch assembly providing
improved load distribution when towing an implement.
During towing operations, the agricultural implement is
coupled to the agricultural vehicle via a hitch assembly,
which transfers the load of the implement to the frame rear
end of the agricultural vehicle. As such, various components
of the hitch assembly, such as the draw bar hanger, may
experience significant stress/loading from the implement.
Such stress/loading may be due, for example, to the imple-
ment weight and/or the implement vibrating or moving up
and down while the agricultural vehicle is towing the
implement. The implement may also be pivotable relative to
the agricultural vehicle, which may cause further stress/
loading to be exerted on the hitch assembly.

In several embodiments, the disclosed hitch assembly
allows the load transmitted from the implement to the
agricultural vehicle during towing operations to be distrib-
uted to reduce stress/loading on the drawbar hanger of the
hitch assembly. Specifically, the hitch assembly includes a
draw bar assembly pivotably coupled to the frame (e.g., the
frame rear end) of the agricultural vehicle and configured to
be coupled to the agricultural implement. In addition, the
hitch assembly may include a draw bar hanger coupled to the
frame and the draw bar assembly. The draw bar hanger, in
turn, includes a first lateral plate coupled to the frame (e.g.,
the frame rear end), with the junction between the first
lateral plate and the frame defining a first corner. Further-
more, the draw bar hanger includes a second lateral plate
opposite the first lateral plate and coupled to the frame (e.g.,
the frame rear end), with the junction of the second lateral
plate and the frame defining a second corner. Moreover, the
draw bar hanger may include a structural member extending
along a lateral direction from the first lateral plate to the
second lateral plate, with the lateral direction being perpen-
dicular to the travel direction of the vehicle. The junction
between the structural member and the first lateral plate
defines a third corner, and the junction between the structural
member and the second lateral plate defines a fourth corner.
Additionally, the draw bar hanger includes a cross-bracing
plate including one or more arms configured to distribute a
towing load received from the agricultural implement
throughout the cross-bracing plate. For example, in some
embodiments, the cross-bracing plate may include a plural-
ity of arms coupling the cross-bracing plate to the draw bar
hanger and the frame of the agricultural vehicle such that the
cross-bracing plate distributes the load received from the
implement to reduce the stress that the cross-bracing plate
experiences. Furthermore, the cross-bracing plate may
extend along the lateral direction from the first lateral plate to the second lateral plate and along a longitudinal direction
from the frame to the structural member.

Referring now to FIG. 1, a side view of one embodiment
of an agricultural vehicle 10 that may be used to tow an
implement 50 is illustrated in accordance with aspects of the
present subject matter. As shown, in the illustrated embodi-
ment, the agricultural vehicle 10 is configured as an agri-
cultural tractor. However, in other embodiments, the agri-
cultural vehicle 10 may be configured as any other suitable
agricultural vehicle known in the art configured to tow an
implement 50. Likewise, in the illustrated embodiment, the
implement 50 is configured as a tillage implement. However,
in other embodiments, the implement 50 may be configured
as any other suitable implement.

As shown in FIG. 1, the agricultural vehicle 10 includes
a pair of front wheels 12, a pair of rear wheels 14, and a
frame or chassis 16 coupled to and supported by the wheels
12, 14. However, in other embodiments, the agricultural
vehicle 10 may include one or more tracks (not shown)
coupled to and supporting the frame or chassis 16. An
operator's cab 18 may be supported by a portion of the
chassis 16 and may house various input devices 20, 21 for
permitting an operator to control the operation of the agri-
cultural vehicle 10. Additionally, the agricultural vehicle 10
may include an engine 22 and a transmission 24 mounted on
the chassis 16. The transmission 24 may be operably
coupled to the engine 22 and may provide variably adjusted
gear ratios for transferring engine power to the wheels via a
drive axle assembly 26 (or via axles if multiple drive axles
are employed).

Additionally, as shown in FIG. 1, the agricultural vehicle
10 may, in one embodiment, include a hitch assembly 100
configured to couple the implement 50 to the agricultural
vehicle 10. The hitch assembly 100 may include a draw bar
102 extending along a longitudinal direction 28 parallel to a
direction of travel 8 of the agricultural vehicle 10 between
a draw bar first end 104 and a draw bar second end 106.
Specifically, the drawbar 102 may provide a connection
point for coupling the implement 50 to the agricultural
vehicle 10. For example, as shown in the illustrated embodi-
ment, the draw bar first end 104 may be coupled to the frame
or chassis 16 via a first bracket 42 and the draw bar second
end 106 may be coupled to a tongue 52 of the implement 50
via a pin (not shown) or other suitable coupling device. In
addition, the draw bar 102 may be pivotable along a lateral
direction 32 (FIG. 2A) perpendicular to the direction of
travel 8 and the longitudinal direction 28. For example, the
draw bar first end 104 may be pivotably coupled to the frame
or chassis 16 such that the draw bar second end 106 is
pivotable relative to the frame or chassis 16. Moreover, the
draw bar 102 may be configured to receive forces exerted by
the implement 50 while the agricultural vehicle 10 is towing
the implement 50. However, in alternative embodiments, the
draw bar 102 may have any other suitable configuration.

Furthermore, the hitch assembly 100 of the agricultural
vehicle 10 may include a draw bar hanger 108 coupled to the
frame 16 of the agricultural vehicle 10 and the draw bar 102.
The draw bar hanger 108 may be configured to support the
draw bar 102. For example, as will be described below with
reference to FIG. 2A, the draw bar hanger 108 may be
configured to support the draw bar hanger 102 at the draw
bar second end 106. When the agricultural vehicle 10 is
towing the implement 50, the forces exerted by the imple-
ment 50 are transferred to the draw bar hanger 108 via the
drawbar 102. As will be described below with reference to FIG. 2A, the drawbar hanger 108 includes a first lateral plate 110, a second lateral plate 112, a structural member 114, and a cross-bracing plate 116.

As shown in FIG. 1, the frame or chassis 16 of the agricultural vehicle 10 may generally extend along the longitudinal direction 28 between a frame front end 56 and a frame rear end 58. The frame rear end 58 will be described in detail below in reference to FIG. 2A. Additionally, the draw bar hanger 108 may be coupled to the frame 16 at the frame rear end 58.

Moreover, as shown in FIG. 1, the implement 50 may include an implement frame 54 and one or more ground-engaging tools 72 that are coupled to and extend downwardly from the implement frame 54 In general, the ground-engaging tool(s) 72 may correspond to any suitable tools or devices configured to selectively engage the ground or driving surface 60 of the agricultural vehicle 10, such as one or more shanks, discs, rakes, planter modules, harrows and/or any other suitable ground cultivating and/or conditioning devices or tools. As shown in FIG. 1, the ground-engaging tools 72 may be configured to contact or otherwise penetrate the vehicle driving surface 60. For example, in the illustrated embodiment, the ends of the ground-engaging tools 72 may be configured to be positioned on or at a given depth 74 relative to the vehicle driving surface 60 when the implement 50 is located at its lowered or ground-engaging position.

It should be appreciated that the configuration of the agricultural vehicle 10 and the implement 50 described above and shown in FIG. 1 is provided only to place the present subject matter in an exemplary field of use. Thus, it should be appreciated that the present subject matter may be readily adaptable to any manner of agricultural vehicle or implement configuration. For example, in an alternative agricultural vehicle embodiment, a separate frame or chassis may be provided to which the engine 22, transmission 24, and drive axle assembly 26 are coupled, a configuration common in smaller tractors. Still other configurations may use an articulated chassis to steer the agricultural vehicle 10, or rely on tracks in lieu of the tires 12, 14.

Figure 2A:
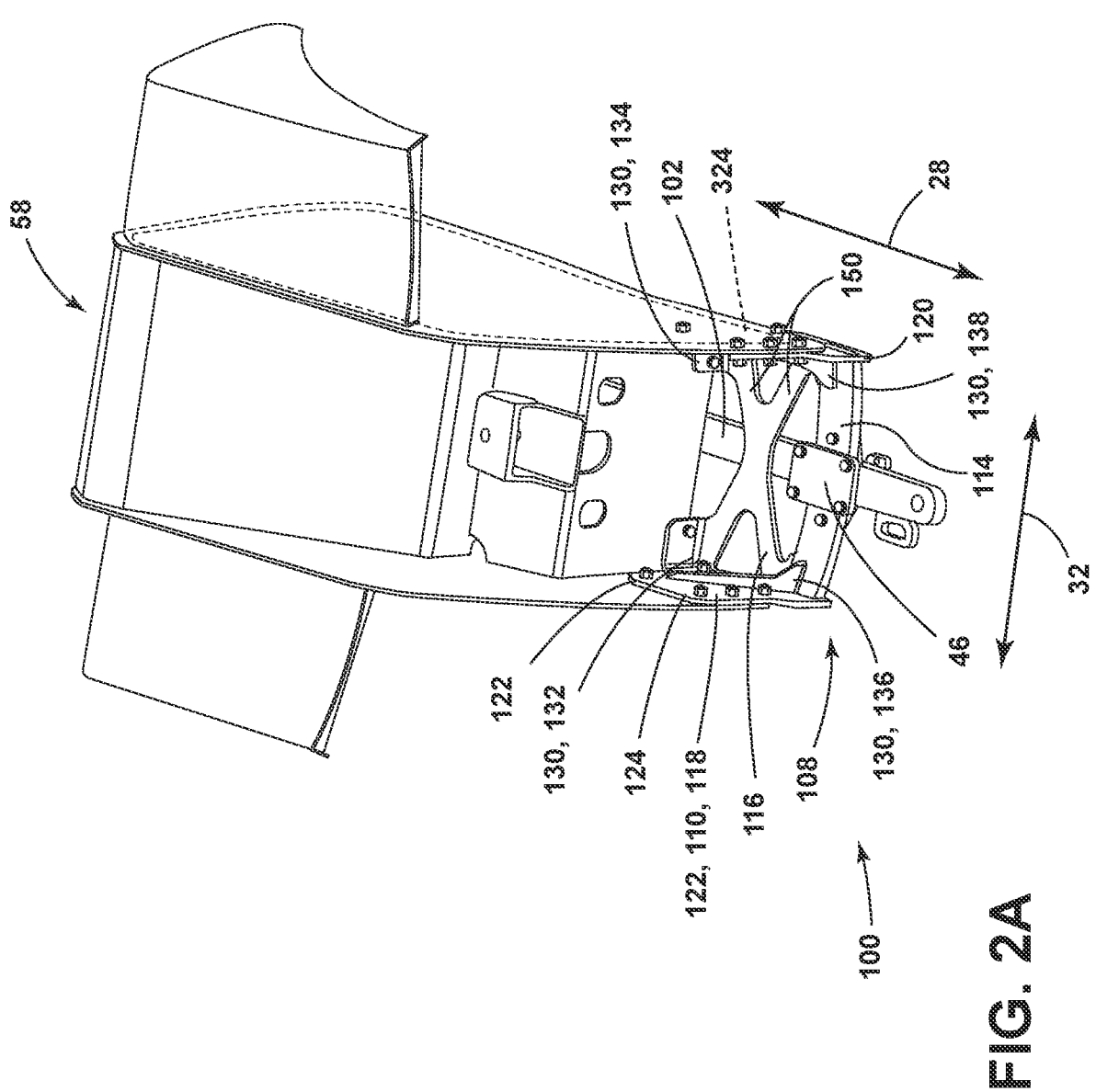
FIG. 2A illustrates a rear, perspective view of one embodiment of a hitch assembly of an agricultural vehicle in accordance with aspects of the present subject matter, particularly illustrating the frame rear end of the agricultural vehicle, the drawbar, and the drawbar hanger.

Referring now to FIG. 2A, a rear perspective view of one embodiment of a hitch assembly 100 of an agricultural vehicle 10 is illustrated in accordance with aspects of the present subject matter. In particular, FIG. 2A illustrates the draw bar and the draw bar hanger of the hitch assembly 100.

As mentioned above, the agricultural vehicle 10 includes the draw bar hanger 108, which is coupled to the frame rear end 58 of the agricultural vehicle 10 and configured to receive forces exerted by the implement 50 during towing operations (e.g., via the draw bar 102). For example, as illustrated in FIG. 2A, the draw bar hanger 108 extends along the lateral direction 32 from a hanger first side 118 to a hanger second side 120. The draw bar hanger 108 may include a first lateral plate 110 positioned at the hanger first side 118 and a second lateral plate 112 positioned at the hanger second side 120. The second lateral plate 112 may be opposite the first lateral plate 110 and separated from the first lateral plate 110 along the lateral direction 32. The first lateral plate 110 (e.g., metal plate) of the draw bar hanger 108 may be coupled to the frame rear end 58. Additionally, the second lateral plate 112 (e.g., metal plate) of the draw bar hanger 108 may be coupled to the frame rear end 58.

Additionally, the first lateral plate 110 may include a first lateral plate first surface 122 and a first lateral plate second surface 124 spaced apart from the lateral plate first surface 122 along the lateral direction 32. For example, the first lateral plate first surface 122 may correspond to a first side of the first lateral plate 110 and the first lateral plate second surface 124 may correspond to a second side of the first lateral plate 110. Likewise, the second lateral plate 112 may include a second lateral plate first surface 322 and a second lateral plate second surface 324 spaced apart from the second lateral plate first surface 322 along the lateral direction 32. For example, the second lateral plate first surface 322 may correspond to a first side of the second lateral plate 112 and the second lateral plate second surface 324 may correspond to a second side of the second lateral plate 112. The first lateral plate first surface 122, the second lateral plate first surface 322, the first lateral plate second surface 124, and the second lateral plate second surface 324 may have similar sizes and shapes.

In some embodiments, the first lateral plate first surface 122 and the second lateral plate first surface 322 may be parallel to each other. In some further embodiments, the first lateral plate second surface 124 and the second lateral plate second surface 324 may be parallel to each other. In these respects, the first lateral plate 110 and the second lateral plate 112 are parallel with each other.

Furthermore, the drawbar hanger 108 may include a structural member 114 extending along the lateral direction 32 from the first lateral plate 110 to the second lateral plate 112. For example, as shown in the FIG. 2A, the structural member 114 is configured as a crossbar extending along the lateral direction 32 from the first lateral plate 110 and to the second lateral plate 112 and is coupled to the first lateral plate 110 and the second lateral plate 112. However, in alternative embodiments, the structural member 114 may be configured in any other suitable manner.

Moreover, the draw bar hanger 108 may include a cross-bracing plate 116 extending along the lateral direction 32 from the first lateral plate 110 of the draw bar hanger 108 to the second lateral plate 112 of the draw bar hanger 108 and along the longitudinal direction 28 from the frame rear end 58 to the structural member 114. The cross-bracing plate 116 may be coupled to the first lateral plate 110, the second lateral plate 112, the rear frame 58, and the structural member 114. As will be described in detail below in reference to FIGS. 2B and 2C, the cross-bracing plate 116 includes one or more arms 150 configured to distribute a towing load received from the agricultural vehicle 10 throughout the cross-bracing plate 116.

Moreover, the draw bar hanger 108 may include one or more corners 130 defined by junctions of the first lateral plate 110, the structural member 114, the frame rear end 58, and the second lateral plate 112. Each corner 130 may correspond to an angle defined by a junction (i.e., coupling point) of two or more components. For example, as shown in FIG. 2A, a junction of the first lateral plate 110 and the frame rear end 58 defines a first corner 132, in which the first corner 132 approximately defines a right angle (e.g., an angle between 80 degrees and 100 degrees). Likewise, a junction of the second lateral plate 112 and the frame rear end 58 defines a second corner 134, in which the second corner 134 approximately defines a right angle (e.g., an angle between 80 degrees and 100 degrees). Additionally, a junction of the first lateral plate 110 and the structural member 114 defines a third corner 136, in which the third corner 136 approximately defines a right angle (e.g., an angle between 80 degrees and 100 degrees). Likewise, a junction of the second lateral plate 112 and the structural member 114 defines a fourth corner 138, in which the fourth corner 138 approximately defines a right angle (e.g., an angle between 80 degrees and 100 degrees). However, it should be appreciated that the first corner 132, the second corner 134, the third corner 136, and the fourth corner 138 may be at any other suitable angle. As will be described below in reference to FIG. 2B, each corner 130 is a coupling location for each arm 150 of the cross-bracing plate 116. As such, each corner 130 may transfer load to each arm 150 of the cross-bracing plate 116.

Figure 2B:
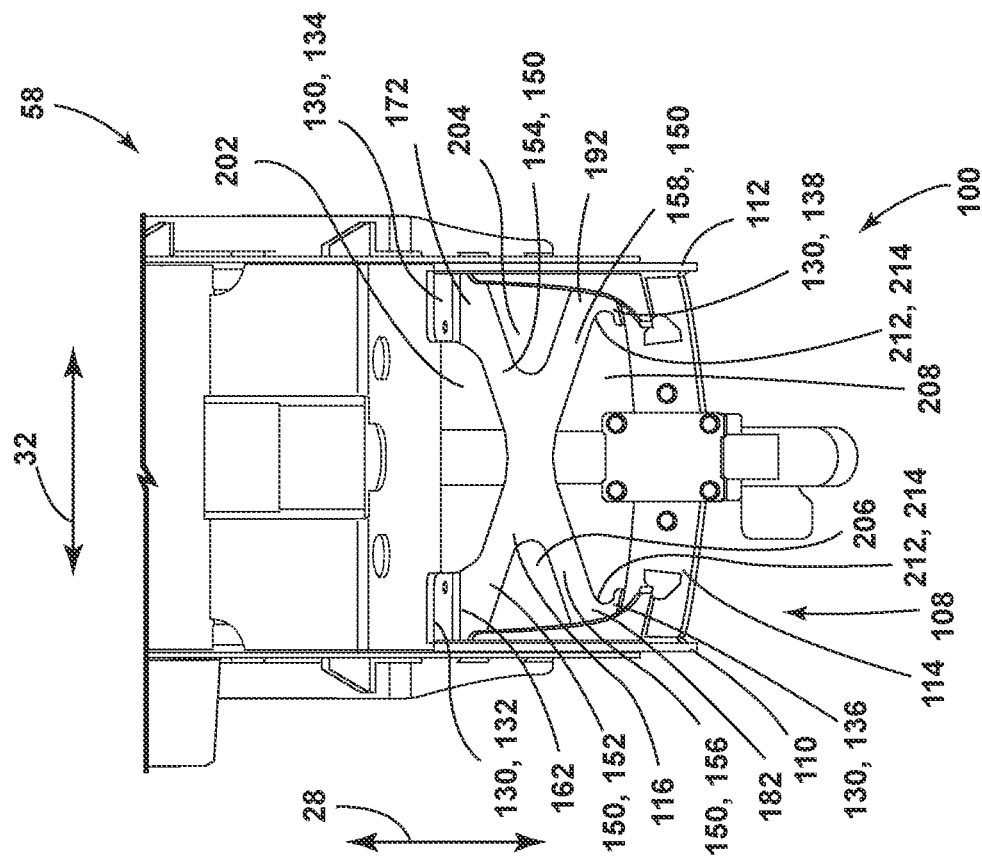
FIG. 2B illustrates a top view of the hitch assembly shown in FIG. 2A, particularly illustrating the drawbar hanger and the frame rear end of the agricultural vehicle.

In addition, the draw bar hanger 108 may be configured to support the draw bar 102 described above in reference to FIG. 1. For instance, as shown in FIG. 2B, the hitch assembly 100 includes a second bracket 46 that couples the draw bar 102 to the draw bar hanger 108 such that the draw bar 102 is supported by the draw bar hanger 108. In several embodiments, the draw bar 102 is coupled to the draw bar hanger 108 by the second bracket 46 adjacent to the draw bar second end 106. In particular, the second bracket 46 couples the drawbar 102 to the structural member 114 of the draw bar hanger 108. The second bracket 46 may be configured to allow the draw bar 102 to pivot about the draw bar first end 104 (FIG. 1). For example, the second bracket 46 may be rigidly coupled to the draw bar 102 and configured to receive the structural member 114 of the drawbar hanger 108 therethrough such that the draw bar second end 106 may move (e.g., slideably movable) relative to the structural member 114 along the lateral direction 32.

Additionally, as mentioned previously, the draw bar hanger 108 may be configured to receive forces exerted by the implement 50 during towing operations while the agricultural vehicle 10 is towing the implement 50. Initially, the draw bar 102 may receive force exerted by the implement 50 during towing operations via a connection point between the draw bar 102 and the implement 50. For example, the draw bar second end 106 may receive forces exerted by the implement 50 via the tongue 52 of the implement 50. The draw bar 102 may transfer forces exerted by the implement 50 on the draw bar 102 during towing operations to the draw bar hanger 108. For example, the draw bar 102 may transfer forces to the structural member 114 of the draw bar hanger 108 via the second bracket 46. As forces are exerted on the structural member 114, the cross-bracing plate 116 may be stretched or compressed in the longitudinal direction 28 by the frame rear end 58 and the structural member 114 and/or in the lateral direction 32 by the frame rear end 58. In this regard, forces are transferred from the frame rear end 58 and the structural member 114 to the cross-bracing plate 116. As mentioned previously and will be described below in reference to FIG. 2B, the forces may be transferred to the cross-bracing plate 116 at one or more coupling points, such as at each corner 130. Furthermore, the forces may be transferred to the cross-bracing plate 116 via each arm 150. The arms 150 may be configured to receive the forces and distribute the forces received throughout the cross-bracing plate 116.

Referring now to FIG. 2B, a top view of the hitch assembly 100 shown in FIG. 2A is illustrated in accordance with aspects of the present subject matter. In particular, FIG. 2B illustrates the draw bar hanger and the frame rear end of the agricultural vehicle 10.

As mentioned previously and shown in FIG. 2B, the draw bar hanger 108 includes the cross-bracing plate 116. The cross-bracing plate 116 also includes one or more arms 150 configured to distribute a towing load received from the agricultural vehicle 10 throughout the cross-bracing plate 116. For example, as shown in FIG. 2B, the cross-bracing plate 116 includes a first arm 152, a second arm 154, a third arm 156, and a fourth arm 158. However, it should be appreciated that the cross-bracing plate 116 may include any other suitable number of arms. For example, as will be described below in reference to FIGS. 3A and 3B, the cross-bracing plate 116 may only include the first arm 152.

As shown in FIG. 2B, the first arm 152 of the cross-bracing plate 116 extends from a first end 162 of the first arm 152 to a second end 164 of the first arm 152. The first end 162 of the first arm 152 is coupled to the first lateral plate 110 of the draw bar hanger 108 and the frame rear end 58 at the first corner 132. Additionally, the second arm 154 extends from a first end 172 of the second arm 154 to a second end 174 of the second arm 154. The first end 172 of the second arm 154 is coupled to the second lateral plate 112 of the draw bar hanger 108 and the frame rear end 58 at the second corner 134. Moreover, the third arm 156 may extend from a first end 182 of the third arm 156 to a second end 184 of the third arm 156. The first end 182 of the third arm 156 is coupled to the first lateral plate 110 and the structural member 114 at the third corner 136. Furthermore, as shown in FIG. 2C, the cross-bracing plate 116 includes a fourth arm 158. Furthermore, the fourth arm 158 may extend from a first end 192 of the fourth arm 158 to a second end 194 of the fourth arm 158. The first end 192 of the fourth arm 158 is coupled to the second lateral plate 112 and the structural member 114 at the fourth corner 138.

Additionally, as shown in FIG. 2B, the second ends 164, 174, 184, 194 of the first arm 152, the second arm 154, the third arm 156, and the fourth arm 158 are coupled together. For example, the second ends 164, 174, 184, 194 may define a junction, such as a center junction 250 of the cross-bracing plate 116. The center junction 250 may be located at a geometric center of the cross-bracing plate 116. However, the center junction 250 may be located at any other suitable location.

Moreover, the arms 150 may define one or more gaps in the cross-bracing plate 116. For example, the first arm 152, the second arm 154, and the cross-bracing plate 116 may define a first gap 202 extending from the first arm 152 to the second arm 154. The second arm 154, the fourth arm 158, and the cross-bracing plate 116 may define a second gap 204 extending from the second arm 154 to the fourth arm 158. The first arm 152, the third arm 156, and the cross-bracing plate 116 may define a third gap 206 extending from the first arm 152 to the third arm 156. The third arm 156, the fourth arm 158, and the cross-bracing plate 116 may define a fourth gap 208 extending from the third arm 156 to the fourth arm 158. As illustrated in FIG. 2B, each of the first gap 202, the second gap 204, the third gap 206, and the fourth gap 208 defines a triangular shape. The triangular shape of each gap 202, 204, 206, and 208 allows the load to be distributed throughout the cross-bracing plate 116 to mitigate localized stresses and/or strains in the draw bar hanger 108.

Furthermore, the first end 182 of the third arm 156 and the first end 192 of the fourth arm 158 each define a curve 212. For example, the curve 212 of the third arm 156 and the curve 212 of the fourth arm 158 may each define vertices 214 of the fourth gap 208, which, as mentioned above, may define a triangular shape.

Referring now to FIG. 2C, a rear perspective view of the cross-bracing plate of the draw bar hanger of the hitch assembly 100 shown in FIGS. 2A and 2B is illustrated in accordance with aspects of the present subject matter. As shown in FIG. 2C, the cross-bracing plate 116 includes a cross-bracing plate first surface 222, a cross-bracing plate second surface 224, and a cross-bracing plate third surface 226. The cross-bracing plate first surface 222 and the cross-bracing plate second surface 224 may be parallel relative to a field surface and may be separated along a vertical direction 34, which is perpendicular to the lateral direction 32 and the longitudinal direction 28, by the cross-bracing plate third surface 226. As such, the cross-bracing plate third surface 226 may extend from the cross-bracing plate first surface 222 to the cross-bracing plate second surface 224. Furthermore, the cross-bracing plate first surface 222 and the cross-bracing plate second surface 224 may have larger surface areas than the cross-bracing plate third surface 226.

As shown in FIG. 2C, the cross-bracing plate 116 includes one or more flanges in which the cross-bracing plate 116 may be coupled to other components of the draw bar hanger 108 (FIG. 2A, 2B) and/or the frame rear end 58 (FIG. 2A, 2B). In the FIG. 2C embodiment, the first end 162 of the first arm 152 of the cross-bracing plate 116 includes a first flange 216 and the first end 172 of the second arm 154 includes a second flange 218. The first flange 216 and the second flange 218 are integrally formed with the first arm 152 and the second arm 162. For example, the first arm 152 and the first flange 216, and the second arm 162 and the second flange 218 may be formed/manufactured such that the cross-bracing plate 116 is a single continuous piece. Furthermore, each flange of the cross-bracing plate 116 provides additional surface area for the cross-bracing plate 116 to receive and distribute forces exerted by the implement 50 during towing operations. The first flange 216 and the second flange 218 may be coupled to the frame rear end 58 of the agricultural vehicle 10 (FIGS. 2A, 2B). However, the cross-bracing plate 116 may include any suitable number or configuration of flanges which may be coupled to any suitable location. For example, as will be described below in reference to the FIG. 3B embodiment, the cross-bracing plate 116 may include only a first flange 216. Furthermore, as shown in FIG. 2C, the first flange 216 and the second flange 218 extend away from the cross-bracing plate first surface 222 along a vertical direction 34 relative to the cross-bracing plate first surface 222.

Figure 2D:
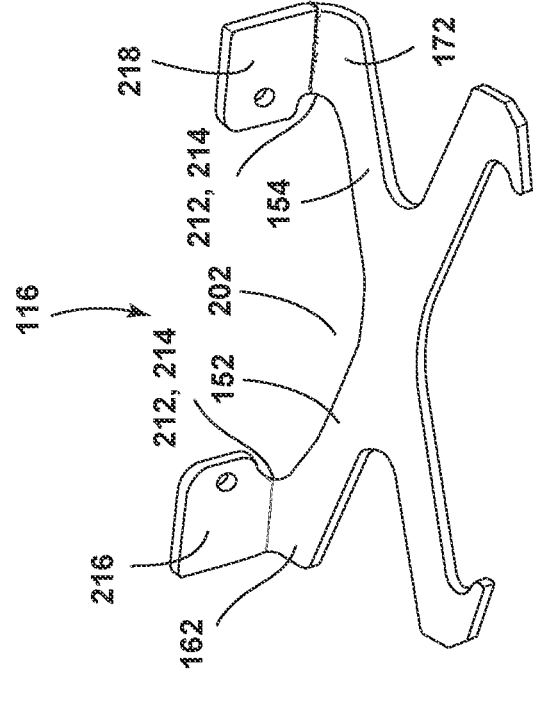
FIG. 2D illustrates a rear perspective view of another embodiment of the cross-bracing plate of drawbar hanger of the hitch assembly shown in FIGS. 2A, 2B, and 2C.
Figure 2C:
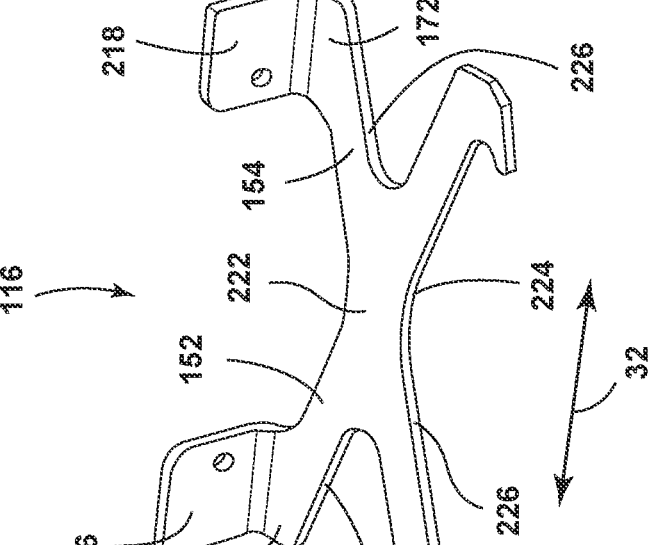
FIG. 2C illustrates a rear perspective view of a cross-bracing plate of the drawbar hanger of the hitch assembly shown in FIGS. 2A and 2B.

Referring now to FIG. 2D, a rear perspective view of another embodiment of the cross-bracing plate of the draw-bar hanger of the hitch assembly 100 shown in FIGS. 2A, 2B, and 2C is illustrated in accordance with aspects of the present subject matter. As shown in the FIG. 2D embodiment, the first end 162 of the first arm 152 and the first end 172 of the second arm 154 each define a curve 212. For example, the curve 212 of the first arm 152 and the curve 212 of the second arm 154 may each define vertices 214 of the first gap 202, which, as mentioned above, may define a triangular shape.

Additionally, as shown in the FIG. 2D embodiment, the cross-bracing plate 116 includes the one or more flanges in which the cross-bracing plate 116 may be coupled to other components of the draw bar hanger 108 (FIG. 2A, 2B) and/or the frame rear end 58 (FIG. 2A, 2B). In the FIG. 2D embodiment, the first end 162 of the first arm 152 of the cross-bracing plate 116 includes the first flange 216 coupled thereto via a weld bead. Likewise, the first end 172 of the second arm 154 of the cross-bracing plate 116 includes the second flange 218 coupled thereto via a weld bead.

Figures 3A, 3B:
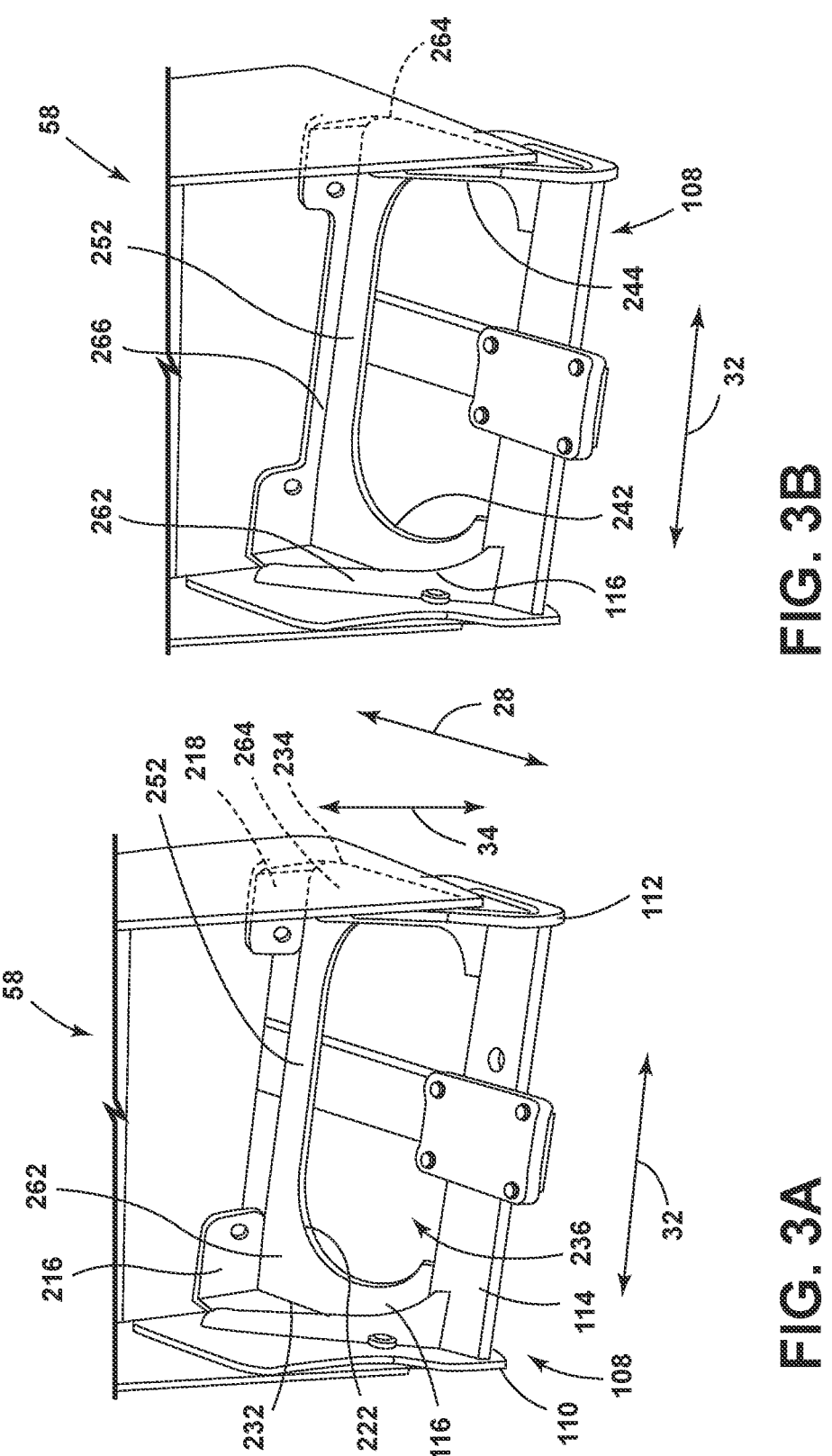
FIG. 3A illustrates a rear, perspective view of another embodiment of a hitch assembly of an agricultural vehicle in accordance with aspects of the present subject matter, particularly illustrating the cross-bracing plate of the drawbar hanger with a first arm and first and second flanges.
FIG. 3B illustrates a rear, perspective view of the hitch assembly shown in FIG. 3A, particularly illustrating an additional embodiment of the cross-bracing plate of the draw bar hanger with a first arm and a first flange.

Referring now to FIGS. 3A and 3B, rear, perspective views of different embodiments of the hitch assembly 100 of the agricultural vehicle 10 are illustrated in accordance with aspects of the present subject matter. In particular, FIG. 3A illustrates an additional embodiment of the cross-bracing plate of the draw bar hanger with a first arm, a first flange, and a second flange. FIG. 3B illustrates the additional embodiment of the cross-bracing plate of the draw bar hanger with a first arm and a first flange.

As mentioned previously, the cross-bracing plate 116 of the draw bar hanger 108 may extend along the lateral direction 32 from the first lateral plate 110 of the draw bar hanger 108 to the second lateral plate 112 of the draw bar hanger 108 and along the longitudinal direction 28 from the frame rear end 58 to the structural member 114. As shown in the FIGS. 3A and 3B embodiments, the cross-bracing plate 116 includes a cross-bracing plate first side 232 and a cross-bracing plate second side 234 opposite the plate first side 232. For example, the cross-bracing plate first side 232 and the cross-bracing plate second side 234 may each correspond to an edge of the cross-bracing plate 116. The cross-bracing plate first side 232 is coupled to the first lateral plate 110 of the draw bar hanger 108 and extends along the longitudinal direction 28 from the frame rear end 58 of the agricultural vehicle 10 to the structural member 114 of the draw bar hanger 108. Additionally, the cross-bracing plate second side 234 is coupled to the second lateral plate 112 of the drawbar hanger 108 and extends along the longitudinal direction from the frame rear end 58 to the structural member 114. Moreover, the cross-bracing plate first side 232 may define a first side curve 242. Likewise, the cross-bracing plate second 234 may define a second side curve 244. As such, the first side curve 242 may be opposite the second side curve 244 and oriented such that the first side curve 242 is facing the second side curve 244.

As shown in FIGS. 3A and 3B, a first arm 252 of the cross-bracing plate 116 may extend along the lateral direction 32 from the cross-bracing plate first side 232 to the cross-bracing plate second side 234. The first end 262 of the first arm 252 may be coupled to the cross-bracing plate first side 232 and the second end 264 of the first arm 252 may be coupled to the cross-bracing plate second side 234. The cross-first side curve 242, the second side curve 244, and the first arm 252 may define a gap, such as a C-shaped gap 236, extending along the lateral direction 32 from the cross-bracing plate first side 232 to the cross-bracing plate second side 234 and along the longitudinal direction 28 from the first arm 252 to the structural member 114 of the drawbar hanger 108. Furthermore, the first arm 252 may be configured to distribute a towing load received from the agricultural vehicle 10 throughout the cross-bracing plate 116.

Referring to the embodiment shown in FIG. 3A, the cross-bracing plate 116 includes the first flange 216 coupled to the first end 262 of the first arm 252 and the frame rear end 58 of the agricultural vehicle 10. The cross-bracing plate 116 also includes the second flange 218 coupled to the second end 264 of the first arm 252 and the frame rear end 58 of the agricultural vehicle 10. Furthermore, as shown in FIG. 3A, the first flange 216 and the second flange 218 extend away from the cross-bracing plate first surface 222 along the vertical direction 34 relative to the cross-bracing plate first surface 222.

Referring to the embodiment shown in FIG. 3B, the cross-bracing plate 116 includes a first flange 266 coupled to the first arm 252 and the frame rear end 58 of the agricultural vehicle 10. The first flange 266 extends along the lateral direction 32 from the first end 262 of the first arm 252 to the second end 264 of the first arm 252.

It should be appreciated that the embodiments of the drawbar hanger 108, particularly the cross-bracing plate 116, described above in reference to FIGS. 3A and 3B may be configured in any other suitable arrangement.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. An agricultural vehicle, comprising:
a frame;
a drawbar assembly pivotably coupled to the frame and configured to be coupled to an agricultural implement; and
a drawbar hanger coupled to the frame and the drawbar assembly, the drawbar hanger comprising:
a first lateral plate coupled to the frame, wherein a junction of the first lateral plate and the frame defines a first corner;
a second lateral plate opposite the first lateral plate coupled to the frame, wherein a junction of the second lateral plate and the frame defines a second corner;
a structural member extending along a lateral direction from the first lateral plate to the second lateral plate, wherein a junction of the structural member and the first lateral plate define a third corner and a junction of the structural member and the second lateral plate define a fourth corner; and
a cross-bracing plate comprising an arm configured to distribute a towing load received from the agricultural implement throughout the cross-bracing plate, the cross-bracing plate extending along the lateral direction from the first lateral plate to the second lateral plate and along a longitudinal direction from the frame to the structural member.

2. The agricultural vehicle of claim 1, wherein the arm corresponds to a first arm extending from a first end to a second end, the first end of the first arm being coupled to the first lateral plate and the frame at the first corner, the cross-bracing plate of the drawbar hanger further comprising:
a second arm extending from a first end to a second end, wherein the first end of the second arm is coupled to the second lateral plate and the frame at the second corner;
a third arm extending from a first end to a second end, wherein the first end of the third arm is coupled to the first lateral plate and the structural member at the third corner; and
a fourth arm extending from a first end to a second end, wherein the first end of the fourth arm is coupled to the second lateral plate and the structural member at the fourth corner.

3. The agricultural vehicle of claim 1, wherein the second ends of the first arm, the second arm, the third arm, and the fourth arm are coupled together and define a center junction of the cross-bracing plate.

4. The agricultural vehicle of claim 3, wherein:
the cross-bracing plate and the first arm and the second arm of the cross-bracing plate define a first gap extending from the first arm to the second arm;
the cross-bracing plate and the second arm and the fourth arm of the cross-bracing plate define a second gap extending from the second arm to the fourth arm;
the cross-bracing plate and the first arm and the third arm of the cross-bracing plate define a third gap extending from the first arm to the third arm; and the cross-bracing plate and the third arm and the fourth arm of the cross-bracing plate define a fourth gap extending from the third arm to the fourth arm.

5. The agricultural vehicle of claim 4, wherein:
the first gap, the second gap, the third gap, and the fourth gap each define a triangular shape.

6. The agricultural vehicle of claim 2, wherein the first end of the first arm comprises a first flange and the first end of the second arm comprises a second flange, wherein the first flange and the second flange are coupled to the frame of the agricultural vehicle.

7. The agricultural vehicle of claim 6, wherein the first flange and the second flange extend away from a cross-bracing plate first surface along a vertical direction relative to the cross-bracing plate first surface, the vertical direction being perpendicular to the lateral direction and the longitudinal direction.

8. The agricultural vehicle of claim 2, wherein:
the first ends of the first arm, the second arm, the third arm and the fourth arm each define a curve,
wherein the curve of the first arm and the curve of the second arm each define vertices of the first triangular shaped gap, and
wherein the curve of the third arm and the curve of the fourth arm define vertices of the fourth triangular shaped gap.

9. The agricultural vehicle of claim 1, wherein the cross-bracing plate of the drawbar hanger further comprises:
a cross-bracing plate first side coupled to the first lateral plate and extending along the longitudinal direction from the frame to the structural member; and
a cross-bracing plate second side opposite the cross-bracing plate first side and coupled to the second lateral plate and extending along the longitudinal direction from the frame to the structural member,
wherein the arm extends along the lateral direction from a first end to a second end, wherein the first end of the arm is coupled to the cross-bracing plate first side and the second end of the arm is coupled to the cross-bracing plate second side.

10. The agricultural vehicle of claim 9, wherein the cross-bracing plate first side, the cross-bracing plate second side, and the arm define a C-shaped gap extending from the cross-bracing plate first side to the cross-bracing plate second side in the lateral direction and from the arm to the structural member in the longitudinal direction.

11. The agricultural vehicle of claim 10, wherein the cross-bracing plate further comprises:
a first flange coupled to the first end of the arm and the frame; and
a second flange coupled to the second end of the arm and the frame.

12. The agricultural vehicle of claim 10, wherein the cross-bracing plate further comprises:
a flange extending along the lateral direction from the first end to the second end of the arm, wherein the flange is coupled to the arm and the frame.

13. The agricultural vehicle of claim 6, wherein:
the first flange is welded to the first end of the first arm; and
the second flange is welded to the second end of the second arm.

14. A hitch assembly for an agricultural vehicle, the hitch assembly comprising:
a drawbar assembly pivotably coupled to a frame of an agricultural vehicle and configured to be coupled to an agricultural implement; and

13 a drawbar hanger coupled to the frame and the drawbar assembly, the drawbar hanger comprising:

a cross-bracing plate including a cross-bracing plate first surface, a cross-bracing plate second surface, a cross-bracing plate third surface, and a plurality of arms configured to distribute the load received from the agricultural implement throughout the cross-bracing plate, wherein the cross-bracing plate first surface and the cross-bracing plate second surface are parallel to a field surface and have larger surface areas than the cross-bracing plate third surface, and wherein each of the plurality of arms extend from a first end to a second end.

15. The hitch assembly of claim 14, wherein the drawbar hanger further comprises:

a first lateral plate coupled to the frame of the agricultural vehicle, wherein a junction of the first lateral plate and the frame defines a first corner;

a second lateral plate opposite the first lateral plate coupled to the frame, wherein a junction of the second lateral plate and the frame defines a second corner; and a structural member extending along a lateral direction from the first lateral plate to the second lateral plate, wherein a junction of the structural member and the first lateral plate define a third corner and a junction of the structural member and the second lateral plate define a fourth corner, wherein, the cross-bracing plate extends along the lateral direction from the first lateral plate to the second lateral plate and along a longitudinal direction from the frame to the structural member.

16. The hitch assembly of claim 15, wherein:

a first end of a first arm of the cross-bracing plate is coupled to the first lateral plate and the frame at the first corner;

a first end of a second arm of the cross-bracing plate is coupled to the second lateral plate and the frame at the second corner;

a first end of a third arm of the cross-bracing plate is coupled to the first lateral plate and the structural member at the third corner; and a first end of a fourth arm of the cross-bracing plate is coupled to the second lateral plate and the structural member at the fourth corner.

17. The hitch assembly of claim 16, wherein the second ends of the first arm, the second arm, the third arm, and the fourth arm are coupled together and define a center junction of the cross-bracing plate.

18. The hitch assembly of claim 17, wherein:

the cross-bracing plate and the first arm and the second arm of the cross-bracing plate define a first gap extending from the first arm to the second arm;

the cross-bracing plate and the second arm and the fourth arm of the cross-bracing plate define a second gap extending from the second arm to the fourth arm;

the cross-bracing plate and the first arm and the third arm of the cross-bracing plate define a third gap extending from the first arm to the third arm; and the cross-bracing plate and the third arm and the fourth arm of the cross-bracing plate define a fourth gap extending from the third arm to the fourth arm.

19. The hitch assembly of claim 18, wherein:

the first gap, the second gap, the third gap, and the fourth gap each define a triangular shape.

20. The hitch assembly of claim 16, wherein the first end of the first arm comprises a first flange and the first end of the second arm comprises a second flange, wherein the first flange and the second flange are coupled to the frame of the agricultural vehicle.

* * * * *